US008785590B2

(12) United States Patent
Ishii et al.

(10) Patent No.: US 8,785,590 B2
(45) Date of Patent: Jul. 22, 2014

(54) POLYAMIDE

(75) Inventors: Kentaro Ishii, Kanagawa (JP); Shun Ogawa, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 153 days.

(21) Appl. No.: 13/391,075

(22) PCT Filed: Aug. 18, 2010

(86) PCT No.: PCT/JP2010/063907
§ 371 (c)(1),
(2), (4) Date: Feb. 17, 2012

(87) PCT Pub. No.: WO2011/021633
PCT Pub. Date: Feb. 24, 2011

(65) Prior Publication Data
US 2012/0172572 A1 Jul. 5, 2012

(30) Foreign Application Priority Data

Aug. 20, 2009 (JP) ................. 2009-191289
Aug. 20, 2009 (JP) ................. 2009-191290

(51) Int. Cl.
*C08G 69/26* (2006.01)
*C08L 77/06* (2006.01)
(52) U.S. Cl.
CPC .............. *C08G 69/26* (2013.01); *C08G 69/265* (2013.01); *C08L 77/06* (2013.01)
USPC ............ 528/339; 528/308; 528/335; 528/344
(58) Field of Classification Search
CPC ....... C08G 69/26; C08G 69/265; C08L 77/06
USPC ................. 528/308, 335, 339, 344
See application file for complete search history.

(56) References Cited

U.S. PATENT DOCUMENTS

| 3,534,002 | A | 10/1970 | Gibbons |
| 4,246,395 | A | 1/1981 | Mortimer |
| 4,640,973 | A | 2/1987 | Davis et al. |
| 5,288,793 | A | 2/1994 | Chen |
| 5,416,189 | A * | 5/1995 | Vandevijver et al. ......... 528/347 |
| 2011/0224370 | A1 | 9/2011 | Kanda et al. |
| 2011/0245454 | A1 | 10/2011 | Kuwahara et al. |
| 2012/0065327 | A1 | 3/2012 | Ogawa et al. |

FOREIGN PATENT DOCUMENTS

| JP | 48-52752 | 7/1973 |
| JP | 48 66193 | 9/1973 |

OTHER PUBLICATIONS

Combined Chinese Office Action and Search Report issued Nov. 2, 2012 in Chinese Patent Application No. 201080036919.6 (with English Translation of Categories of Cited Documents).
International Search Report Issued Oct. 26, 2010 in PCT/JP10/63907 Filed Aug. 18, 2010.
U.S. Appl. No. 13/395,535, filed Mar. 12, 2012, Ogawa, et al.
U.S. Appl. No. 13/395,541, filed Mar. 12, 2012, Ishii, et al.
The Extended European Search Report issued Aug. 9, 2013, in Application No. / Patent No. 10809974.8-1306 / 2468796 PCT/JP2010063907.
Rudolph D. Deanin, et al., "Polymers of Hydrogenated and Chlorinated Naphthalene-2,6-dicarboxylic Acids", Journal of Polymer Science, Part A-1, vol. 6, No. 1, XP055072943, 1968, pp. 235-240.

* cited by examiner

*Primary Examiner* — Gregory Listvoyb
(74) *Attorney, Agent, or Firm* — Oblon, Spivak, McClelland, Maier & Neustadt, L.L.P.

(57) ABSTRACT

The invention provides a polyamide having a dicarboxylic acid unit containing a decahydronaphthalenedicarboxylic acid unit in an amount of 60 mol % or more, and a diamine unit.

10 Claims, No Drawings

POLYAMIDE

TECHNICAL FIELD

The present invention relates to a polyamide, and more particularly to a transparent polyamide.

BACKGROUND ART

Crystalline polyamide, such as nylon 6 or nylon 66, has been widely used in fibers, films, or general-purpose engineering plastic materials, since it exhibits, for example, excellent moldability, mechanical properties, and chemical resistance. In recent years, in association with expansion of application fields of polyamide, increasing demand has arisen for transparent polyamide (i.e., a polymer having polyamide properties and transparency) to be used in, for example, films, eyeglass lenses, and covers of various devices.

There have been proposed various methods for producing transparent polyamide, including a method in which three or more monomers are copolymerized, and a method employing a diamine having a plurality of cyclohexane rings. For example, Patent Document 1 discloses a transparent thermoplastic polyamide produced, by a known method, through polycondensation between hexamethylenediamine and a mixture of isophthalic acid or a polyamide-formable functional derivative of isophthalic acid (70 to 85%) and terephthalic acid or a polyamide-formable functional derivative of terephthalic acid (30 to 15%). Patent Document 2 discloses a transparent polyamide resin formed of (A) a unit derived from a dicarboxylic acid and (B) a unit derived from a diamine, wherein the dicarboxylic acid of the unit (A) is formed of (A-1) a unit derived from a C6 to C22 branched saturated dicarboxylic acid (50 to 100 mol %) and (A-2) a unit derived from isophthalic acid (0 to 50 mol %); the diamine of the unit (B) is a diamine represented by a specific structural formula; and the ratio by mole of the unit (A) to the unit (B) is 100:95 to 100:105. Patent Document 3 discloses a colorless, transparent amorphous polyamide produced from a combination of a C14 to C22 alkyl-substituted alicyclic diamine and a C8 to C14 non-branched aliphatic dicarboxylic acid which may be partially replaced, up to 20 mol %, with an aromatic dicarboxylic acid, or a combination of a C8 to C14 non-branched aliphatic diamine and a C7 to C36 alicyclic dicarboxylic acid which may be partially replaced, up to 20 mol %, with an aromatic dicarboxylic acid. Patent Document 4 discloses a transparent thermoplastic polyamide produced from an alicyclic diamine, a lactam or the corresponding amino acid having at least seven carbon atoms, and terephthalic acid or an isophthalic acid-terephthalic acid mixture containing terephthalic acid in an amount of 50% or more.

CITATION LIST

Patent Literature

[Patent Document 1]: JP-B-49-36959
[Patent Document 2]: JP-A-2000-1544
[Patent Document 3]: JP-A-08-239469
[Patent Document 4]: JP-B-2631535

SUMMARY OF THE INVENTION

Technical Problem

Most polyamides produced through copolymerization of three or more monomers may become turbid or lose transparency after the elapse of a long time from polymerization or through immersion in boiling water, even if they are transparent immediately after polymerization.

Demand for transparent polyamide having enhanced heat resistance is expected to grow in the pharmaceutical and food fields wherein such polyamide is used for producing, for example, a molded product requiring sterilization treatment at high temperature and high pressure.

However, most conventional transparent polyamides exhibit insufficient heat resistance, and thus they are difficult to use in applications requiring high heat resistance. For example, Patent Documents 2, 3, and 4 specifically disclose a polyamide having a glass transition temperature (™) of about 100 to about 170° C., a polyamide having a Tg of about 140 to about 170° C., and a polyamide having a Tg of about 110 to about 150° C., respectively. However, these polyamides exhibit insufficient heat resistance, and thus are difficult to use in applications requiring heat resistance.

A first problem to be solved by the present invention is to provide a transparent polyamide which is less likely to become turbid and does not lose transparency even in boiling water. A second problem to be solved by the present invention is to provide a transparent polyamide having high Tg and exhibiting excellent heat resistance.

Solution to Problem

The present inventors have conducted extensive studies on polyamides produced from various raw materials (dicarboxylic acids and diamines), and as a result have found that when a transparent polyamide is produced from decahydronaphthalenedicarboxylic acid (hereinafter may be referred to as "H-NDCA") serving as a dicarboxylic acid component, regardless of the type of a diamine employed, the transparent polyamide is less likely to become turbid when immersed in boiling water. Also, the present inventors have further conducted extensive studies, and as a result have found that when a transparent polyamide is produced from H-NDCA serving as a dicarboxylic acid component and an aromatic diamine and/or an alicyclic diamine serving as a diamine component, the transparent polyamide exhibits high Tg and excellent heat resistance. The present invention has been accomplished on the basis of these findings.

The present invention provides a polyamide having a dicarboxylic acid unit containing a decahydronaphthalenedicarboxylic acid unit in an amount of 60 mol % or more, and a diamine unit.

Advantageous Effects of Invention

Even when the transparent polyamide of the present invention is immersed in boiling water, the polyamide is less likely to become turbid and does not lose transparency. Therefore, the transparent polyamide of the present invention can be suitably employed for applications requiring polyamide properties and high transparency.

The transparent polyamide of the present invention, which is produced from an aromatic diamine and/or an alicyclic diamine serving as a diamine component, exhibits high Tg and excellent heat resistance. Therefore, the transparent polyamide of the present invention can be suitably employed for applications requiring high heat resistance and transparency.

According to the present invention, a transparent polyamide can be produced without employing three or more monomers.

DESCRIPTION OF EMBODIMENTS

Polyamide

The polyamide of the present invention has a dicarboxylic acid unit containing a decahydronaphthalenedicarboxylic acid unit in an amount of 60 mol % or more, and a diamine unit. The polyamide of the present invention may further have a structural unit other than the aforementioned units, so long as the effects of the present invention are not impaired. As used herein, the term "dicarboxylic acid unit" refers to a unit derived from a dicarboxylic acid, and the term "diamine unit" refers to a unit derived from a diamine.

(Dicarboxylic Acid Unit)

The dicarboxylic acid unit of the polyamide of the present invention contains a decahydronaphthalenedicarboxylic acid unit (H-NDCA unit) in an amount of 60 mol % or more, from the viewpoint of transparency. The H-NDCA unit content is preferably 70 mol % or more, from the viewpoint of prevention of turbidity in boiling water. The H-NDCA unit content is preferably 95 mol % or more, from the viewpoint of heat resistance. Particularly preferably, the H-NDCA unit content is substantially 100 mol %.

Examples of the compound capable of forming the H-NDCA unit include, but are not limited to, 1,4-decahydronaphthalenedicarboxylic acid (1,4-H-NDCA), 2,6-decahydronaphthalenedicarboxylic acid (2,6-H-NDCA), and 2,7-decahydronaphthalenedicarboxylic acid (2,7-H-NDCA). These compounds may be employed singly or in combination of two or more species.

From the viewpoints of transparency and high Tg, the dicarboxylic acid unit of the polyamide of the present invention preferably contains a 2,6-H-NDCA unit in an amount of 60 mol % or more, more preferably 70 mol % or more, much more preferably 95 mol % or more. The 2,6-H-NDCA unit content is preferably 100 mol % or less.

The compound capable of forming the dicarboxylic acid unit (other than H-NDCA unit) of the polyamide of the present invention may be, for example, a linear aliphatic dicarboxylic acid such as succinic acid, glutaric acid, adipic acid, pimelic acid, suberic acid, azelaic acid, sebacic acid, 1,10-decanedicarboxylic acid, 1,11-undecanedicarboxylic acid, or 1,12-dodecanedicarboxylic acid, from the viewpoints of raw material availability and cost. The compound may be, for example, an aromatic dicarboxylic acid such as terephthalic acid, isophthalic acid, 2,6-naphthalenedicarboxylic acid, or biphenyldicarboxylic acid, from the viewpoints of transparency and high Tg. These compounds may be employed singly or in combination of two or more species.

(Diamine Unit)

The diamine unit of the polyamide of the present invention may be any of an aliphatic diamine unit, an aromatic diamine unit, and an alicyclic diamine unit, from the viewpoint of transparency.

From the viewpoints of transparency and high Tg, the diamine unit of the polyamide of the present invention preferably contains an aromatic diamine unit and/or an alicyclic diamine unit in an amount of 70 mol % or more, more preferably 80 mol % or more, much more preferably 90 mol % or more, particularly preferably substantially 100 mol %. The aromatic diamine unit and/or the alicyclic diamine unit is preferably one or more species selected from the group consisting of an m-xylylenediamine unit, a p-xylylenediamine unit, a 1,3-bis(aminomethyl)cyclohexane unit, and a 1,4-bis(aminomethyl)cyclohexane unit.

The compound capable of forming the aliphatic diamine unit is preferably a C1 to C16 linear or branched aliphatic diamine, more preferably a C2 to C12 linear or branched aliphatic diamine, much more preferably a C3 to C10 linear or branched aliphatic diamine. Specific examples of the aliphatic diamine include, but are not limited to, ethylenediamine, trimethylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine, 2,2,4-trimethylhexamethylenediamine, and 2,4,4-trimethylhexamethylenediamine.

The compound capable of forming the aromatic diamine unit is preferably a C6 to C16 aromatic diamine, more preferably a C6 to C10 aromatic diamine. The compound is preferably an aromatic diamine having at least one benzene ring or naphthalene ring.

Specific examples of the aromatic diamine include, but are not limited to, m-phenylenediamine, p-phenylenediamine, m-xylylenediamine, p-xylylenediamine, 4,4'-diaminobiphenyl, 3,3'-diaminodiphenyl ether, 4,4'-diaminodiphenyl ether, 3,3'-diaminodiphenyl sulfide, 4,4'-diaminodiphenyl sulfide, 3,3'-diaminodiphenyl sulfoxide, 4,4'-diaminodiphenyl sulfoxide, 3,3'-diaminodiphenyl sulfone, 4,4'-diaminodiphenyl sulfone, 3,3'-diaminodiphenyl methanone, 4,4'-diaminodiphenyl methanone, 3,3'-diaminodiphenylmethane, 4,4'-diaminodiphenylmethane, bis(3-methyl-4-aminophenyl)methane, 1,1-bis(4-aminophenyl)ethane, 2,2-bis(3-aminophenyl)propane, 2,2-bis(4-aminophenyl)propane, 1,5-diaminonaphthalene, 1,8-diaminonaphthalene, and 2,3-diaminonaphthalene.

The compound capable of forming the alicyclic diamine unit is preferably a C3 to C20 alicyclic diamine, more preferably a C6 to C16 alicyclic diamine, much more preferably a C6 to C10 alicyclic diamine. The compound is preferably an alicyclic diamine having at least one cyclohexane ring.

Specific examples of the alicyclic diamine include, but are not limited to, 1,3-diaminocyclohexane, 1,4-diaminocyclohexane, 1,3-bis(aminomethyl)cyclohexane, 1,4-bis(aminomethyl)cyclohexane, 4,4'-diaminodicyclohexylmethane, bis(3-methyl-4-aminocyclohexyl)methane, bis(3-methyl-4-amino-5-ethylcyclohexyl)methane, 1,2-bis(4-aminocyclohexyl)ethane, 2,2'-bis(4-aminocyclohexyl)propane, and 2,2'-bis(3-methyl-4-aminocyclohexyl)propane.

The above-exemplified compounds may be employed singly or in appropriate combination of two or more species. From the viewpoint of transparency, any of the aforementioned compounds may be employed. From the viewpoints of transparency and high Tg, one or more compounds selected from the group consisting of m-xylylenediamine, p-xylylenediamine, 1,3-bis(aminomethyl)cyclohexane, and 1,4-bis(aminomethyl)cyclohexane are preferably employed.

(Production Method for Polyamide)

The polyamide of the present invention may be produced through a method including a step of polycondensation of a dicarboxylic acid component containing decahydronaphthalenedicarboxylic acid in an amount of 60 mol % or more and a diamine component. Specifically, the polyamide of the present invention may be produced through polycondensation of any of the aforementioned dicarboxylic acid components capable of forming a dicarboxylic acid unit and any of the aforementioned diamine components capable of forming a diamine unit. According to the present invention, a transparent polyamide can be produced without employing three or more monomers.

No particular limitation is imposed on the method for producing the polyamide of the present invention, so long as the aforementioned raw materials can be polymerized through the method. An exemplary production method will now be described. Firstly, an aqueous nylon salt solution containing the aforementioned raw materials in specific proportions by mole is prepared and added to a reactor. The ratio by mole of dicarboxylic acid/diamine is preferably 1/0.985 to 1/1.005, more preferably 1/0.990 to 1/1.000. After purging the reactor with nitrogen, the reactor is heated to preferably 160 to 250° C. (more preferably 180 to 230° C.) with stirring under pressurized conditions. Preferably, the pressure in the reactor is adjusted to 1.5 to 3.0 MPaG and maintained for one to three hours. Water added to the reactor and water produced through polycondensation reaction are removed through evaporation. Thereafter, while the reactor is heated to preferably 200 to 390° C. (more preferably 240 to 350° C.), the pressure in the reactor is reduced to ambient pressure, and optionally to a pressure lower than ambient pressure. Stirring is stopped when a stirring torque reaches a specific level. The resultant polyamide in the reactor is removed in the form of strand, and then pelletized through immersion in cold water.

In order to stabilize the properties of the thus-produced polyamide, an inorganic phosphorus compound, serving as a polymerization promoter or a thermal stabilizer, may optionally be added during polycondensation. Specific examples of the inorganic phosphorus compound include phosphoric acid, phosphorous acid, hypophosphorous acid, pyrophosphoric acid, polyphosphoric acid, and salts of these acids. The amount of such an inorganic phosphorus compound added is generally 50 to 1,000 ppm with respect to that of the polyamide produced. If necessary, a molecular weight regulator (for example, a monoamine such as laurylamine, stearylamine, or benzylamine, or a monocarboxylic acid such as acetic acid, benzoic acid, lauric acid, or stearic acid) may be added. The amount of such a molecular weight regulator added is appropriately determined in consideration of the molecular weight of the polyamide which is to be finally produced.

No particular limitation is imposed on the number average molecular weight (Mn) of the polyamide of the present invention, but the number average molecular weight (Mn) is preferably 5,000 to 100,000, more preferably 10,000 to 30,000. The number average molecular weight of the polyamide may be determined through the method described in the Examples hereinbelow.

The polyamide of the present invention is colorless and transparent. Even when the polyamide is immersed in boiling water, the polyamide is less likely to become turbid and does not lose transparency.

No particular limitation is imposed on the Tg of the polyamide of the present invention, but the Tg is preferably 120 to 250° C., more preferably 180 to 250° C., much more preferably 190 to 240° C. The Tg of the polyamide may be determined through the method described in the Examples hereinbelow. A polyamide having a Tg of 180° C. or higher is suitably employed in applications requiring heat resistance.

The polyamide of the present invention may be produced through molding by means of a film extruder or an injection molding machine. The resin temperature required for stable molding is preferably 200 to 390° C., more preferably 240 to 350° C.

EXAMPLES

The present invention will next be described in more detail by way of examples, which should not be construed as limiting the invention thereto. Evaluation methods employed in Examples and Comparative Examples are as follows.

(1) GPC Measurement

A sample was dissolved in hexafluoroisopropanol, and the number average molecular weight (Mn) of the sample (as reduced to polymethyl methacrylate) was measured by means of a GPC apparatus (manufactured by Tosoh Corporation, trade name: HLC-8320GPC) including two connected columns (manufactured by Tosoh Corporation, trade name: TSKgel SuperHM-H).

(2) DSC Measurement

A sample was heated to 300° C. by means of a differential scanning calorimeter (manufactured by Shimadzu Corporation, trade name: DSC-60) in a nitrogen atmosphere at a temperature elevation rate of 10 degrees (° C.)/min, and the glass transition temperature, crystallization temperature (during temperature elevation), and melting point of the sample were measured.

(3) Evaluation of Transparency

A molten polyamide was press-molded by means of a thermal press-molding machine (manufactured by Ohtake Machinery) at 1.0 MPaG (retention time: 30 seconds), to thereby form a film having a thickness of about 500 μm. The transparency of the film was visually evaluated according to the following criteria:

A: transparent and no turbidity; and

B: generation of turbidity (if any).

(4) Boiling Water Immersion Test

A test piece (1 cm×1 cm) was cut out of the above-formed film and immersed in boiling water (100° C.). The time until generation of turbidity was measured (immersion time: up to 10 hours).

Production Example

Preparation of 2,6-H-NDCA 2,6-H-NDCA employed in the following Examples was prepared by hydrolyzing dimethyl 2,6-decahydronaphthalenedicarboxylate (manufactured by Mitsubishi Gas Chemical Company, Inc.) with sodium hydroxide, followed by neutralization with hydrochloric acid.

Example 1

2,6-H-NDCA (14.77 g, 65.3 mmol), hexamethylenediamine (manufactured by Wako Pure Chemical Industries, Ltd.) (7.58 g, 65.3 mmol), and distilled water (5.59 g) were added to a 200-mL autoclave equipped with a thermometer, a pressure gauge, a nitrogen feed inlet, and a pressure release outlet, and the autoclave was purged with nitrogen. The autoclave was heated to 220° C. over two hours, and maintained at a pressure of 2 MPaG for two hours. Thereafter, while the autoclave was heated to 300° C. over one hour, the pressure therein was reduced to ambient pressure. Then, the autoclave was maintained at 300° C. and ambient pressure for 30 minutes, followed by cooling, to thereby synthesize a polyamide. Table 1 shows the composition of the raw materials employed and the properties of the thus-synthesized polyamide.

Example 2

The procedure of Example 1 was repeated, except that 2,6-H-NDCA (13.53 g, 59.8 mmol), octamethylenediamine (manufactured by Kanto Chemical Co., Inc.) (8.63 g, 59.8 mmol), and distilled water (5.54 g) were added to the same autoclave as employed in Example 1, and that the final temperature was changed to 270° C., to thereby synthesize a polyamide. Table 1 shows the composition of the raw materials employed and the properties of the thus-synthesized polyamide.

Example 3

The procedure of Example 1 was repeated, except that 2,6-H-NDCA (11.59 g, 51.2 mmol), dodecamethylenediamine (manufactured by Tokyo Chemical Industry Co., Ltd.) (10.26 g, 51.2 mmol), and distilled water (5.46 g) were added to the same autoclave as employed in Example 1, and that the final temperature was changed to 250° C., to thereby synthesize a polyamide. Table 1 shows the composition of the raw materials employed and the properties of the thus-synthesized polyamide.

Example 4

2,6-H-NDCA (12.98 g, 57.4 mmol), trimethylhexamethylenediamine (manufactured by Tokyo Chemical Industry Co., Ltd., mixture of 2,2,4-isomer and 2,4,4-isomer) (9.08 g, 57.4 mmol), and distilled water (5.52 g) were added to the same autoclave as employed in Example 1, and synthesis of a polyamide was carried out in the same manner as employed in Example 1. Table 1 shows the composition of the raw materials employed and the properties of the thus-synthesized polyamide.

Example 5

The procedure of Example 1 was repeated, except that 2,6-H-NDCA (13.86 g, 61.3 mmol), m-xylylenediamine (manufactured by Mitsubishi Gas Chemical Company, Inc.) (8.34 g, 61.3 mmol), and distilled water (5.55 g) were added to the same autoclave as employed in Example 1, and that the final temperature was changed to 310° C., to thereby synthesize a polyamide. Table 1 shows the composition of the raw materials employed and the properties of the thus-synthesized polyamide.

Example 6

The procedure of Example 5 was repeated, except that m-xylylenediamine was replaced with p-xylylenediamine (manufactured by Mitsubishi Gas Chemical Company, Inc.), to thereby synthesize a polyamide. Table 1 shows the composition of the raw materials employed and the properties of the thus-synthesized polyamide.

Example 7

2,6-H-NDCA (13.61 g, 60.2 mmol), 1,3-bis(aminomethyl)cyclohexane (manufactured by Mitsubishi Gas Chemical Company, Inc., hereinafter will be referred to as "1,3-BAC") (8.56 g, 60.2 mmol), and distilled water (5.54 g) were added to the same autoclave as employed in Example 1, and synthesis of a polyamide was carried out in the same manner as employed in Example 5. Table 1 shows the composition of the raw materials employed and the properties of the thus-synthesized polyamide.

Example 8

The procedure of Example 5 was repeated, except that 1,3-BAC was replaced with 1,4-bis(aminomethyl)cyclohexane (manufactured by Mitsubishi Gas Chemical Company, Inc., hereinafter will be referred to as "1,4-BAC"), to thereby synthesize a polyamide. Table 1 shows the composition of the raw materials employed and the properties of the thus-synthesized polyamide.

Example 9

2,6-H-NDCA (13.16 g, 58.2 mmol), dodecanedioic acid (manufactured by Wako Pure Chemical Industries, Ltd.) (0.71 g, 3.1 mmol), m-xylylenediamine (8.34 g, 61.2 mmol), and distilled water (5.55 g) were added to the same autoclave as employed in Example 1, and synthesis of a polyamide was carried out in the same manner as employed in Example 1. Table 1 shows the composition of the raw materials employed and the properties of the thus-synthesized polyamide.

Example 10

2,6-H-NDCA (9.67 g, 42.7 mmol), dodecanedioic acid (manufactured by Wako Pure Chemical Industries, Ltd.) (4.22 g, 18.3 mmol), m-xylylenediamine (8.31 g, 61.0 mmol), and distilled water (5.55 g) were added to the same autoclave as employed in Example 1, and synthesis of a polyamide was carried out in the same manner as employed in Example 2. Table 1 shows the composition of the raw materials employed and the properties of the thus-synthesized polyamide.

Example 11

2,6-H-NDCA (8.28 g, 36.6 mmol), dodecanedioic acid (5.62 g, 24.4 mmol), m-xylylenediamine (8.30 g, 61.0 mmol), and distilled water (5.55 g) were added to the same autoclave as employed in Example 1, and synthesis of a polyamide was carried out in the same manner as employed in Example 3. Table 1 shows the composition of the raw materials employed and the properties of the thus-synthesized polyamide.

Comparative Example 1

2,6-H-NDCA (6.89 g, 30.5 mmol), dodecanedioic acid (7.01 g, 30.5 mmol), m-xylylenediamine (8.29 g, 60.9 mmol), and distilled water (5.55 g) were added to the same autoclave as employed in Example 1, and synthesis of a polyamide was carried out in the same manner as employed in Example 3. Table 1 shows the composition of the raw materials employed and the properties of the thus-synthesized polyamide.

Comparative Example 2

Isophthalic acid (manufactured by A.G. International Chemical Co., Inc.) (9.44 g, 56.8 mmol), terephthalic acid (manufactured by Mizushima Aroma Co., Ltd.) (4.05 g, 24.4 mmol), hexamethylenediamine (manufactured by Wako Pure Chemical Industries, Ltd.) (9.44 g, 81.2 mmol), and distilled water (5.73 g) were added to the same autoclave as employed in Example 1, and synthesis of a polyamide was carried out in the same manner as employed in Example 1. Table 1 shows the composition of the raw materials employed and the properties of the thus-synthesized polyamide.

Comparative Example 3

The procedure of Example 1 was repeated, except that 1,4-cyclohexanedicarboxylic acid (manufactured by Tokyo Chemical Industry Co., Ltd., hereinafter will be referred to as "1,4-CHDA") (8.91 g, 51.7 mmol), adipic acid (manufactured by Rhodia) (3.24 g, 22.2 mmol), 1,3-BAC (10.51 g, 73.9 mmol), and distilled water (5.67 g) were added to the same autoclave as employed in Example 1, and that the final temperature was changed to 335° C., to thereby synthesize a polyamide. Table 1 shows the composition of the raw materials employed and the properties of the thus-synthesized polyamide. Since a film formed from the polyamide became turbid, the film was not subjected to the boiling water immersion test.

for applications requiring polyamide properties and high transparency. The polyamide of the present invention, which is produced from an aromatic diamine and/or an alicyclic diamine serving as a diamine component, exhibits high Tg and transparency. Therefore, the polyamide of the present invention can be suitably employed for applications requiring heat resistance, for which conventional transparent polya-

TABLE 1

| | Dicarboxylic acid (mol %) | | Diamine (mol %) | Number average molecular weight Mn | Glass transition temperature (° C.) | Crystallization temperature (° C.) | Melting point (° C.) | Transparency | Time until generation of turbidity in boiling water (h) |
|---|---|---|---|---|---|---|---|---|---|
| Ex. 1 | 2,6-H-NDCA 100 | | Hexamethylenediamine 100 | 22383 | 162 | No peak | No peak | A | 8.5 |
| Ex. 2 | 2,6-H-NDCA 100 | | Octamethylenediamine 100 | 25536 | 148 | No peak | No peak | A | 3 |
| Ex. 3 | 2,6-H-NDCA 100 | | Dodecamethylenediamine 100 | 16647 | 125 | No peak | No peak | A | 1.5 |
| Ex. 4 | 2,6-H-NDCA 100 | | Trimethylhexa-methylenediamine 100 | 11981 | 163 | No peak | No peak | A | >10 |
| Ex. 5 | 2,6-H-NDCA 100 | | m-Xylylenediamine 100 | 14457 | 193 | No peak | No peak | A | >10 |
| Ex. 6 | 2,6-H-NDCA 100 | | p-Xylylenediamine 100 | 11668 | 221 | No peak | No peak | A | >10 |
| Ex. 7 | 2,6-H-NDCA 100 | | 1,3-BAC 100 | 22015 | 217 | No peak | No peak | A | >10 |
| Ex. 8 | 2,6-H-NDCA 100 | | 1,4-BAC 100 | 14368 | 230 | No peak | No peak | A | >10 |
| Ex. 9 | 2,6-H-NDCA 95 | Dodecanedioic acid 5 | m-Xylylenediamine 100 | 14823 | 184 | No peak | No peak | A | >10 |
| Ex. 10 | 2,6-H-NDCA 70 | Dodecanedioic acid 30 | m-Xylylenediamine 100 | 14416 | 140 | No peak | No peak | A | 7 |
| Ex. 11 | 2,6-H-NDCA 60 | Dodecanedioic acid 40 | m-Xylylenediamine 100 | 14371 | 123 | No peak | No peak | A | 1 |
| Comp. Ex. 1 | 2,6-H-NDCA 50 | Dodecanedioic acid 50 | m-Xylylenediamine 100 | 16498 | 109 | No peak | No peak | A | 0.5 |
| Comp. Ex. 2 | Isophthalic acid 70 | Terephthalic acid 30 | Hexamethylenediamine 100 | 9711 | 128 | No peak | No peak | A | 0.5 |
| Comp. Ex. 3 | 1,4-CHDA 70 | Adipic acid 30 | 1,3-BAC 100 | 12800 | 169 | 198 | 321 | B | — |

2,6-H-NDCA: 2,6-decahydronaphthalenedicarboxylic acid
1,3-BAC: 1,3-bis(aminomethyl)cyclohexane
1,4-BAC: 1,4-bis(aminomethyl)cyclohexane
1,4-CHDA: 1,4-cyclohexanedicarboxylic acid As is clear from Table 1, each of the polyamides of Examples 1 to 11 is transparent and has no turbidity, and the time until generation of turbidity in boiling water is longer, as compared with the case of the polyamide of Comparative Example 1 or 2. These data indicate that the polyamide of the present invention is less likely to become turbid and to lose transparency even when immersed in boiling water. As is also clear from Table 1, among the polyamides of Examples 1 to 11, the polyamides of Examples 5 to 9, each containing 2,6-H-NDCA (95 mol % or more) serving as a dicarboxylic acid component, and an aromatic diamine or an alicyclic diamine serving as a diamine component, exhibit a Tg as high as 184 to 230° C., as well as excellent heat resistance.

INDUSTRIAL APPLICABILITY

Even when the polyamide of the present invention is immersed in boiling water, the polyamide is less likely to become turbid and does not lose transparency. Therefore, the polyamide of the present invention can be suitably employed mides are difficult to employ. Thus, the polyamide of the present invention has high industrial value.

According to the present invention, a transparent polyamide can be produced without employing three or more monomers.

The invention claimed is:

1. A transparent polyamide, comprising:
a dicarboxylic acid unit comprising 95 mol % or more of a 2,6-decahydronaphthalenedicarboxylic acid unit, and
a diamine unit comprising 70 mol % or more of at least one unit selected from the group consisting of an m-xylylenediamine unit, a p-xylylenediamine unit, a 1,3-bis(aminomethyl)cyclohexane unit, and a 1,4-bis(aminomethyl)cyclohexane unit.

2. The transparent polyamide of claim 1, which has a glass transition temperature of 180 to 250° C.

3. The transparent polyamide of claim 1, which has a glass transition temperature of 190 to 240° C.

4. The transparent polyamide of claim 1, obtained by a method comprising polycondensing (i) a dicarboxylic acid comprising 95 mol % or more of a 2,6-decahydronaphthalenedicarboxylic acid and (ii) a diamine comprising 70 mol % or more of at least one member selected from the group consisting of m-xylylenediamine, p-xylylenediamine, 1,3-bis(aminomethyl)cyclohexane, and 1,4-bis(aminomethyl)cyclohexane.

5. The transparent polyamide of claim 1, wherein the dicarboxylic acid unit comprises 100% of the 2,6-decahydronaphthalenedicarboxylic acid unit.

6. The transparent polyamide of claim 1, wherein the diamine unit comprises the m-xylylenediamine unit.

7. The transparent polyamide of claim 1, wherein the diamine unit comprises the p-xylylenediamine unit.

8. The transparent polyamide of claim 1, wherein the diamine unit comprises the 1,3-bis(aminomethyl)cyclohexane unit.

9. The transparent polyamide of claim 1, wherein the diamine unit comprises the 1,4-bis(aminomethyl)cyclohexane unit.

10. A film formed from the transparent polyamide of claim 1.

* * * * *